United States Patent [19]
Müller et al.

[11] Patent Number: 5,803,772
[45] Date of Patent: Sep. 8, 1998

[54] TERMINATION DEVICE FOR TELECOMMUNICATION AND DATA TRANSMISSION APPLICATIONS

[75] Inventors: Manfred Müller; Dieter Gerke, both of Berlin, Germany

[73] Assignee: Krone Aktiengesellschaft, Berlin-Zehlendorf, Germany

[21] Appl. No.: 719,094

[22] Filed: Sep. 24, 1996

[30] Foreign Application Priority Data

Sep. 29, 1995 [DE] Germany ................. 195 37 528.9

[51] Int. Cl.⁶ ........................................... H01R 9/26
[52] U.S. Cl. ........................................... 439/716; 439/922
[58] Field of Search ................... 439/716, 922, 439/709, 715

[56] References Cited

U.S. PATENT DOCUMENTS 4,846,735 7/1989 Teichler et al. ............. 439/922 X
4,851,967 7/1989 Gerke et al. ................ 439/922 X
5,411,417 5/1995 Horn et al. .................. 439/922 X

FOREIGN PATENT DOCUMENTS 37 38 322 C2 2/1991 Germany.

*Primary Examiner*—Neil Abrams
*Assistant Examiner*—Daniel Wittels
*Attorney, Agent, or Firm*—McGlew and Tuttle

[57] ABSTRACT

A termination device for telecommunication and data transmission applications, comprising a carrier rail, a base element with a receiving opening and functional modules. Various termination tasks can be solved by the base element being latched or onto or held by the carrier rail. Receiving portions for a termination element for incoming cables and for a termination element for outgoing cables are provided in the base element. A functional module is disposed between the two termination elements.

19 Claims, 4 Drawing Sheets

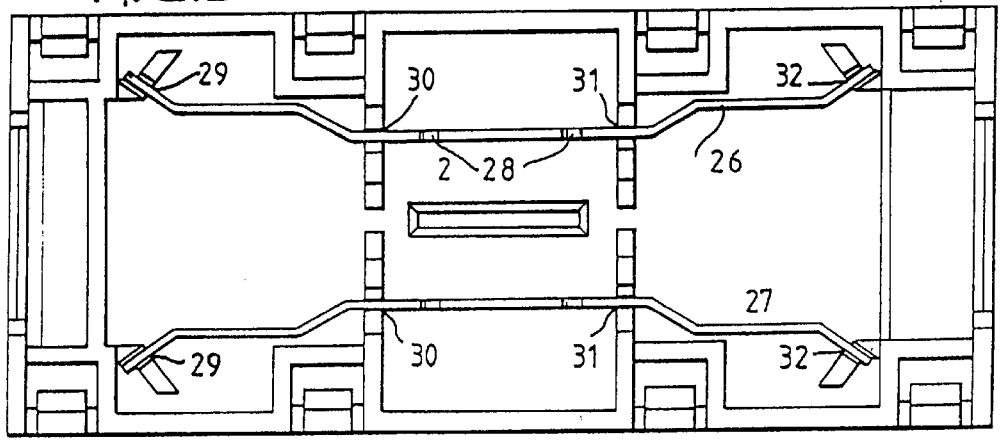
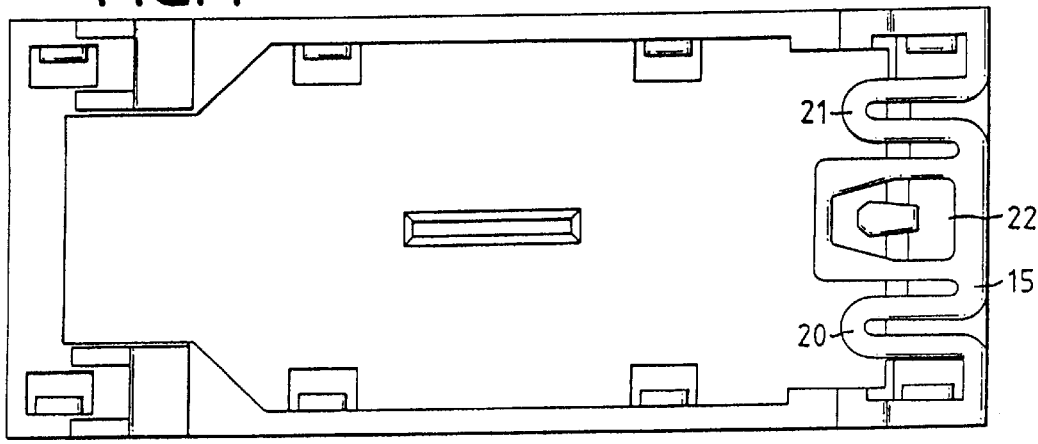
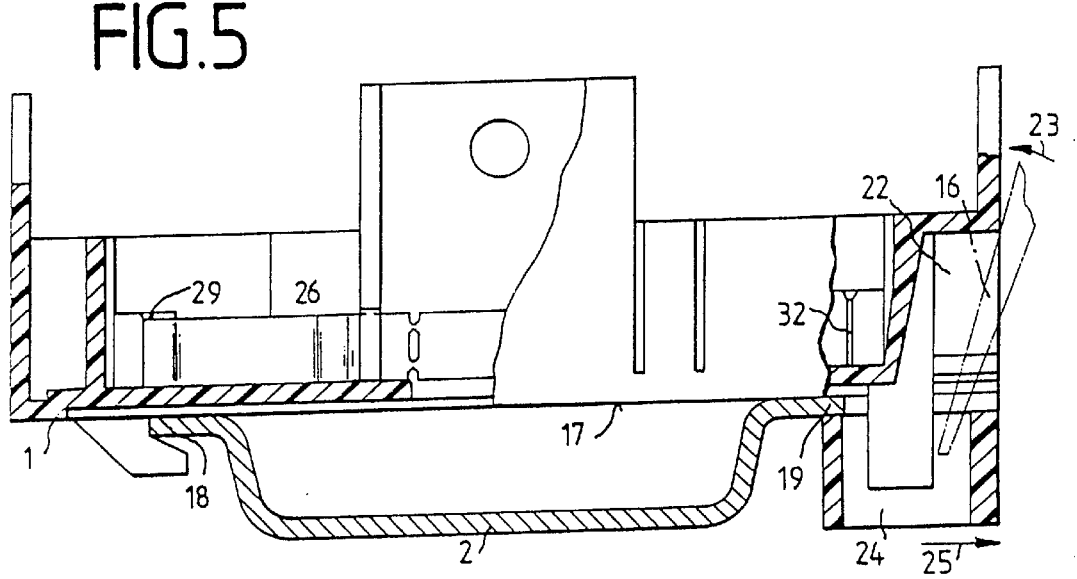

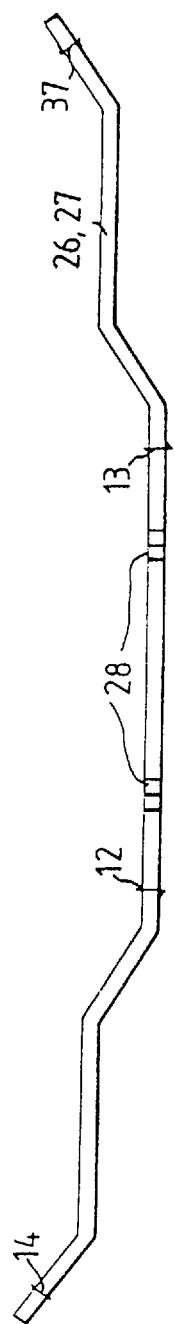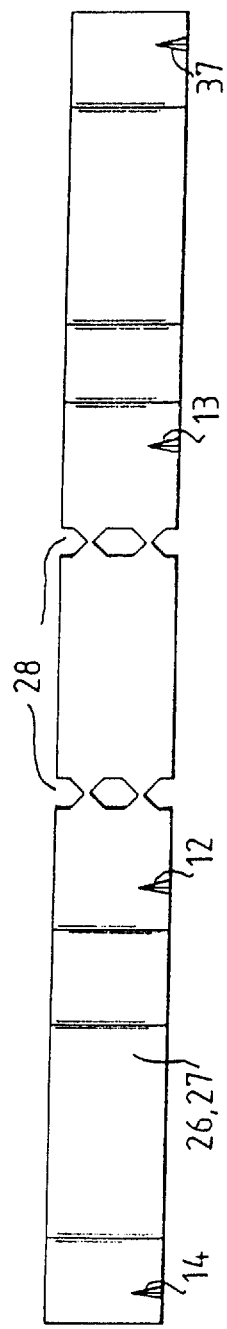

TERMINATION DEVICE FOR TELECOMMUNICATION AND DATA TRANSMISSION APPLICATIONS

FIELD OF THE INVENTION

The present invention relates to a termination device for telecommunication and data transmission applications including a carrier rail, a base element with a receiving opening and functional modules.

BACKGROUND OF THE INVENTION

From DE 37 38 322 C2 it is known in the art to provide a terminal block comprising a base element disposed over resilient latch elements on a carrier rail. In the base element there is provided a receiving opening for a connector element.

It is the object of said described design to provide expansion and reduction possibilities for terminal blocks, without impairing the electrical connections between the partial blocks. The terminal blocks do not allow, however, the combination of different termination possibilities of functional modules, for example to have thick and thin cable wires in one terminal or to apply different protection circuits.

SUMMARY AND OBJECTS OF THE PRESENT INVENTION

It is therefore the primary object of the invention to develop a modular termination device of the type referred to hereinbefore, by means of which various termination tasks can be solved.

According to the invention, a termination device for telecommunication and data transmission applications is provided comprising a carrier rail, the base element with a receiving opening and functional modules. The base element latch able onto the carrier rail. The base element comprises receiving portions for a termination element for incoming cables and for a termination element for outgoing cables. A functional module is disposed between the two termination elements.

The modular construction of the termination device of the functional elements base element, termination elements, functional module, and the latching thereof on standardized carrier rails permits economical design of different terminals, great variability of the terminals, simple assembly, disassembly and modification or addition of terminals without a special tool and an easy disconnection of terminals. The stable base element is provided with receiving portions for the various termination modules and functional modules having identical dimensions. The modules can be released from the carrier rail by using an arbitrary lever, such as a screwdriver. The termination elements and the respective functional modules can be put together in any combination due to their identical dimensions.

The base element comprising the termination elements and a respective functional module can also be configured as one piece.

The base element preferably includes slots for receiving contact tracks. These contact tracks preferably have preset breaking points.

The base element may comprise a spring element in conjunction with a movable holding element for holding on the carrier rail. The base element is preferably made as one piece together with the termination elements and the respective functional module.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 a top view of a base element according to the invention;

FIG. 4 is a bottom view of the base element,

FIG. 5 is a sectional side view of the base element with an integrated spring element according to the invention;

FIG. 6 is a side view of the contact track according to the invention; and

FIG. 7 is a top view showing the development of the contact track of FIG. 6.

DESCRIPTION OF THE PREFERRED EMBODIMENTS

Figure 1:
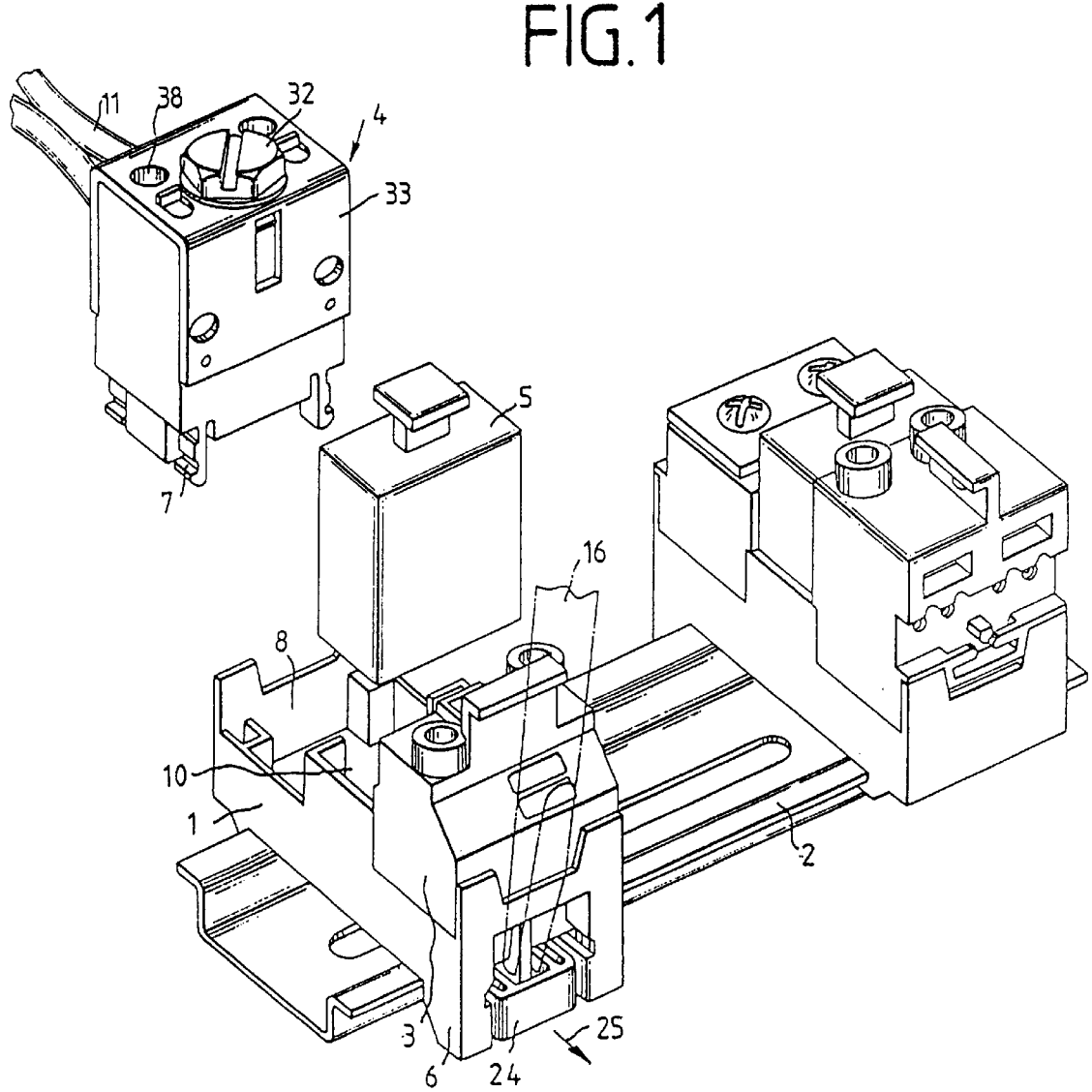
FIG. 1 is a perspective exploded view of a termination device according to the invention.

Referring to the drawings in particular, the invention comprises a modular termination device forming an interface between a subscriber and a central office in a telecommunication network and/or data network.

From FIG. 1 can be seen the modular construction of the termination device. The termination device comprises a base element 1 which is latched by latch elements 6 on a carrier rail, here in the form of a standardized rail, a termination element 3 for outgoing cables, a termination element 4 for incoming cables and a functional module 5.

The termination elements 3, 4 are positioned over latch elements 7 in receiving portions 8, 9 of the base element 1. The functional modules 5 are disposed each between the termination elements 3, 4 in a chamber 10 of the base element 1.

The functional modules 5 are, depending on the specific application, configured as a voltage surge protection module or a remote test module or a RJ tapping portion or the like.

Figure 2:
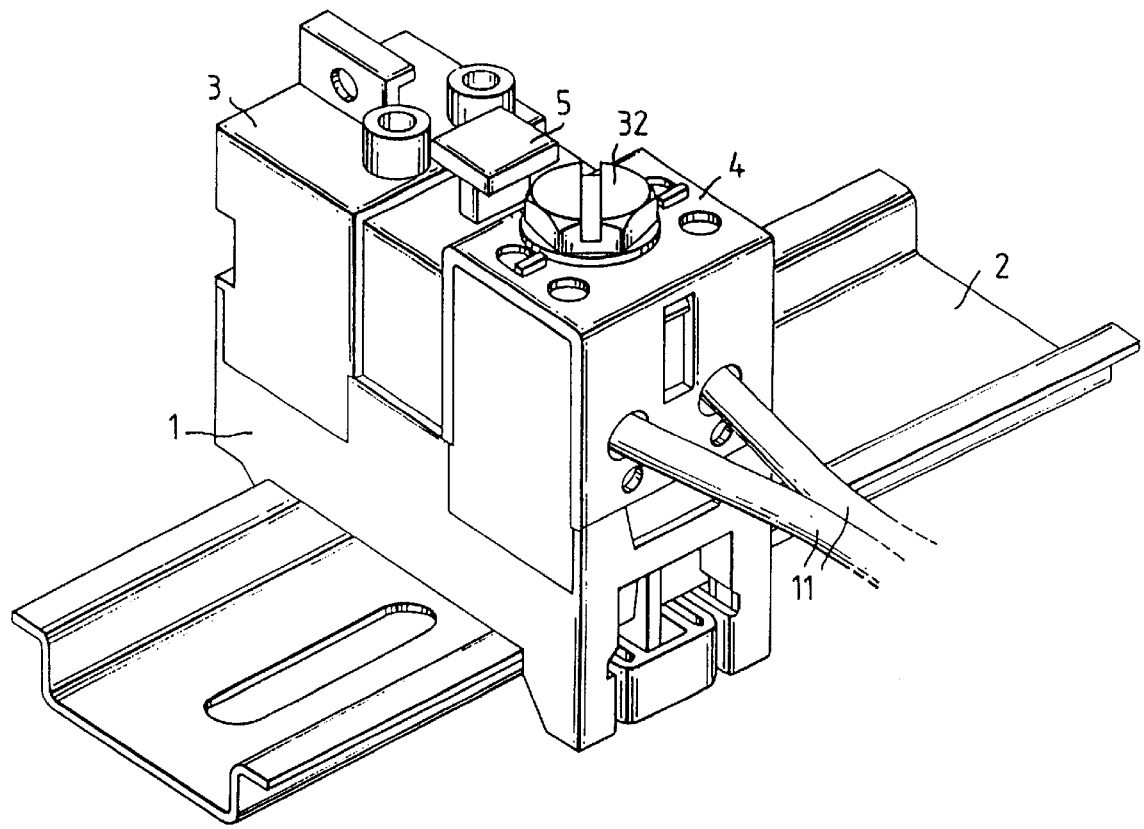
FIG. 2 is a perspective view of the termination device of FIG. 1 in an assembled condition.

In FIGS. 1 and 2 there is shown the application wherein the termination element 4 is formed as a dropwise module connecting a double wire of a dropwise cable 11 to a double wire of a not shown copper cable. Between the termination elements 3, 4 is inserted a voltage surge protection module as functional module 5.

Further applications may form for example the following modules:

"NID" module (network interface device) for the connection of a double wire of a dropwise cable to two double wires of a copper cable (double contact) and connection of a remote test device in series;

"NID neutral" module for the connection of a double wire of a copper cable to the double wire of another copper cable and connection of a remote test device in series;

"NID" module for the connection of a double wire of a copper cable to two double wires of a copper cable (double contact) with inserted remote test device and RJ tapping portion;

"distribution point 11 module for the connection of two double wires of a copper cable to two double wires of another copper cable with inserted voltage surge protection device.

To the base element 1 there is connected or molded-on, respectively, as one piece according to FIGS. 4, 5 a spring element 15 latching over the carrier rail 2 being released by using a screwdriver 16 or other suitable object, in order to remove the base element 1 latched onto the carrier rail 2.

The spring element 15 (FIG. 4) serves for holding the base element 1 on the carrier rail 2 (FIGS. 1, 2, 5). The spring element 15 is connected, according to the representation in FIG. 4, over two resilient wave elements 20, 21 to the bottom 17 of the base element 1 in receiving portions 18, 19 (FIGS. 4, 5). By inserting the screwdriver 16 into an opening 22 of the base element 1 and lifting the screwdriver 16 into the direction of arrow 23, a holding element 24 in the base element 1 is moved in the direction of the arrow 25 and unlatched the base element 1 from the carrier rail 2 (see also FIGS. 1, 4).

In the base element 1 there is inserted two contact tracks 26, 27 according to FIGS. 6, 7 in slots 29, 30, 31, 32 according to the representation in FIG. 3, by means of which the electrical connection between the inserted termination elements 3, 4 and the respectively inserted functional module 5 is established. The contact tracks 26, 27 are so guided and configured in the central area of the base element 1 that by means of a small screwdriver or the like a section 28 (FIG. 7) can be broken out or interrupted so as to be able to insert a 5-position protection device instead of a simple voltage surge protection device, if necessary. The latch claws 12, 13, 14, 17 at the contact tracks 26, 27 each engage in the area of the slots 29 to 32 into the bottom 17 of the base element 1 and guarantee a safe hold of the contact tracks 26, 27 (FIGS. 3, 6).

The latching action of the termination elements 3, 4 in the base element 1 in vertical direction is so executed that the termination zone of the elements 3, 4 latches in two end positions (not shown). In the lower latch position, the usual function is guaranteed; in the upper latch position, the plug connection of the elements 3, 4 to the contact track 26, 27 in the base element 1 can be used as a disconnection position.

In the representation according to FIGS. 1, 2, the termination element 4 is configured as a dropwise termination element. The not shown contact used in the termination zone is so designed that in the upper section dropwise cables and in a lower second contact zone also simple copper wires can be terminated, so that universal application is guaranteed. Contacting is achieved in known manner by a not shown pressure piece being moved by a screw 32. The contact is at an angle of 450 relative to the wire axis. For sealing the contact position, the housing 33 of the termination element 4 is filled up to a certain level with a gel that is pressed laterally around the introduced wire upon movement of the pressure piece and seals the contact position in a water-tight manner. Two openings 38 in the pressure piece (FIG. 1) allow access to the contact for test purposes with banana plugs or the like.

The termination element 3 shown in FIGS. 1, 2 comprises a termination zone for copper wires where a double wire can be terminated without using a tool. The connection is achieved in a known manner with a screwdriver or the like by actuating a not shown plastic slider pressing the copper wires into the contact. For test purposes, the contact can be tapped through openings.

The dimensions of both termination elements 3, 4 are selected such that they can be replaced by each other.

The termination element 3 can also be provided with two sliders, so to be able to parally connect two double wires by a double contact.

The functional module 5 shown in FIGS. 1, 2 is configured as a voltage surge protection device to be inserted into the base element 1 by means of a not shown voltage surge arrester for the protection of the lines.

The termination elements 3, 4 and a respective functional module 5 can be made as one piece together with the base element 1.

While specific embodiments of the invention have been shown and described in detail to illustrate the application of the principles of the invention, it will be understood that the invention may be embodied otherwise without departing from such principles.

What is claimed is:

1. A termination device for telecommunication and data transmission applications, comprising:

a carrier rail;

a base element with a receiving opening, said base element including holding means for holding said base element to said carrier rail, said base element including slots;

contact tracks received within said slots;

a removable and insertable termination element for incoming cables latched in said receiving opening, said receiving opening including an incoming termination element receiving portion of said receiving opening, said oncoming termination element receiving portion providing space for inserting said termination element for incoming cables for latching and for removal of said termination element for incoming cables upon unlatching, said termination element for incoming cables having one of cutting clamping contacts, dropwise contacts and screw contacts;

a removable and insertable termination element for outgoing cables latched in another receiving portion of said receiving opening, said receiving opening including an outgoing termination element receiving portion of said receiving opening, said outgoing termination element receiving portion providing space for inserting said termination element for autgoing cables for latching and for removal of said termination element for outgoing cables upon unlatching, said termination element for outgoing cables having one of cutting clamping contacts, dropwire contacts and screw contacts;

a functional module, said functional module being disposed in aid receiving opening between said termination element for incoming cables and said termination element for outgoing cables, said functional module being one of a voltage surge protection module, a remote test module and a RE taping module, whereby various combinations of said termination element for incoming cables, said termination element for outgoing cables and said functional module are possible using said base element, said termination element for incoming cables and said termination element for outgoing cables being functionally connected to said functional module via said contact tracks.

2. A termination device according to claim 1, wherein in said contact tracks have preset breaking points.

3. A termination device according to claim 1, wherein said holding means comprises a spring element in conjunction with a movable holding element for holding said base element on said carrier rail.

4. A termination device according to claim 1, wherein said base element is made as one piece together with said termination element for incoming cables and said termination element for outgoing cables.

5. A termination device according to claim 1, wherein said base element is further formed in one piece with said functional element.

6. A termination device according to claim 1, further comprising latch means provided on at least one of said termination element for incoming cables and said termination element for outgoing cables for latching said at least one of said termination element for incoming cables and said termination element for outgoing cables to said base element.

7. A termination device for telecommunication and data transmission applications, comprising:
   a carrier rail;
   a base element with a receiving opening, said base element including holding means for holding said base element to said carrier rail, said bade element including slots;
   contract tracks received within said slots;
   a removable and insertable termination element for incoming cables disposed in said receiving opening, said receiving opening including an incoming termination element receiving portion of said receiving opening, said incoming termination element receiving portion providing space for inserting said termination element for incoming cables for latching and for removal of said termination element for incoming cables upon unlatching;
   incoming cable termination element latch means for latching said termination element for incoming cables to said base element;
   a removable and insertable termination element for outgoing cables disposed in said receiving opening, said receiving opening including an outgoing termination element receiving portion of said receiving opening, said outgoing termination element receiving portion providing space for inserting said termination element for outgoing cables for latching and for removal of said termination element for outgoing cables upon unlatching;
   outgoing cable termination element latch means for latching said termination element for outgoing cables to said base element;
   a functional module, said functional module being disposed in said opening between said termination element for incoming cables and said termination element for outgoing cables, said termination element for incoming cables and said termination element for outgoing cables being functionally connectable to said functional module via said contact tracks.

8. A termination device according to claim 7, wherein in said contact tracks have preset breaking points.

9. A termination device according to claim 7, wherein said holding means comprises a spring element in conjunction with a movable holding element for holding said base element on said carrier rail.

10. A termination device according to claim 7, wherein said base element is made as one piece together with said termination element for incoming cables and said termination element for outgoing cables.

11. A termination device according to claim 7, wherein said outgoing cable termination element latch means includes a dual position latch for latching said termination element for outgoing cables to said base element in a first position wherein contacts of said termination element for outgoing cables are not connected to said contact tracks, and a second position wherein contacts of said termination element for outgoing cables are connected to said contact tracks.

12. A termination device according to claim 7, wherein said incoming cable termination element latch means includes a dual position latch for latching said termination element for incoming cables to said base element in a first position wherein contacts of said termination element for incoming cables are not connected to said contact tracks, and a second position wherein contacts of said termination element for incoming cables are connected to said contact tracks.

13. A termination device according to claim 7, wherein said termination element for incoming cables has one of cutting clamping contacts, dropwire contacts and screw contacts, said termination element for outgoing cables has one of cutting clamping contacts, dropwire contacts and screw contacts and said functional module is one of a voltage surge protection module, a remote test module and a RJ taping module, whereby various combinations of said termination element for incoming cables, said termination element for outgoing cables and said functional module are possible using said base element.

14. A termination device for telecommunication and data transmission applications, comprising:
   at carrier rail;
   a base element with a receiving space opening upwardly on a side of said base element which is opposite from said carrier rail, said base element including holding mean for holding said base element to said carrier rail, said base element including slots;
   contact tracks received within said slots;
   a removable and insertable termination element for incoming cables disposed in said receiving space, said receiving opening including an incoming termination element receiving portion of said receiving opening, said incoming termination element receiving portion providing space for inserting said termination element for incoming cables for latching and for removal of said termination element for incoming cables upon unlatching, said termination element for incoming cables having one of cutting clamping contacts, dropwise contacts and screw contacts;
   incoming cable termination element latch means for latching said termination element for incoming cables to said base element;
   a removable and insertable termination element or outgoing cables disposed in said receiving space, said receiving opening including an outgoing termination element receiving portion of said receiving opening, said outgoing termination element receiving portion providing space for inserting said termination element for outgoing cables for latching and for removal of said termination element for outgoing cables upon unlatching, said termination element for outgoing cables having one of cutting clamping contacts, dropwise contacts and screw contacts;
   outgoing cable termination element latch means for latching said termination element for outgoing cables to said base element;
   a functional module, said functional module being disposed in said receiving space between said termination element for incoming cables and said termination element for outgoing cables, said functional module being one of a voltage surge protection module, a remote test module and a RE taping module, whereby various combinations of said termination element for incoming cables, said termination element for outgoing cables and said functional module are possible using said base element, said termination element for incoming cables and said termination element for outgoing cables being functionally connectable to said functional module via said contact tracks.

15. A termination device according to claim 14, wherein in said contact tracks have preset breaking points.

16. A termination device according to claim 14, wherein said holding means comprises a spring element in conjunction with a movable holding element for holding said base element on said carrier rail.

17. A termination device according to claim 14, wherein said base element is made as one piece together with said termination element for incoming cables and said termination element for outgoing cables.

18. A termination device according to claim 14, wherein said outgoing cable termination element latch means includes a dual position latch for latching said termination element for outgoing cables to said base element in a first position wherein contacts of said termination element for outgoing cables are not connected to said contact tracks, and a second position wherein contacts of said termination element for outgoing cables are connected to said contact tracks.

19. A termination device according to claim 14, wherein said incoming cable termination element latch means includes a dual position latch for latching said termination element for incoming cables to said base element in a first position wherein contacts of said termination element for incoming cables are not connected to said contact tracks, and a second position wherein contacts of said termination element for incoming cables are connected to said contact tracks.

\* \* \* \* \*